United States Patent
Cohen et al.

(10) Patent No.: US 7,464,278 B2
(45) Date of Patent: Dec. 9, 2008

(54) COMBINING POWER PREDICTION AND OPTIMAL CONTROL APPROACHES FOR PERFORMANCE OPTIMIZATION IN THERMALLY LIMITED DESIGNS

(75) Inventors: Aviad Cohen, Netanya (IL); Adam De La Zerda, Haifa (IL); Lev Finkelstein, Netanya (IL); Ronny Ronen, Haifa (IL); Dmitry Rudoy, Haifa (IL)

(73) Assignee: Intel Corporation, Santa Clara, CA (US)

( * ) Notice: Subject to any disclaimer, the term of this patent is extended or adjusted under 35 U.S.C. 154(b) by 519 days.

(21) Appl. No.: 11/224,568

(22) Filed: Sep. 12, 2005

(65) Prior Publication Data
US 2007/0061021 A1    Mar. 15, 2007

(51) Int. Cl.
*G06F 1/32* (2006.01)
(52) U.S. Cl. .................. 713/320; 713/322
(58) Field of Classification Search .................. 713/300, 713/320, 322
See application file for complete search history.

(56) References Cited

U.S. PATENT DOCUMENTS

| | | | |
|---|---|---|---|
| 5,490,059 A * | 2/1996 | Mahalingaiah et al. | 700/46 |
| 5,510,687 A | 4/1996 | Ursworth et al. | |
| 5,590,061 A | 12/1996 | Hollowell, II et al. | |
| 5,600,575 A | 2/1997 | Anticole | |
| 5,675,297 A | 10/1997 | Gose et al. | |
| 5,838,187 A | 11/1998 | Embree | |
| 5,913,552 A | 6/1999 | McLellan | |
| 5,996,084 A | 11/1999 | Watts | |
| 6,336,080 B1 | 1/2002 | Atkinson | |
| 6,535,798 B1 | 3/2003 | Bhatia et al. | |
| 6,621,678 B2 | 9/2003 | Wei et al. | |
| 6,925,573 B2 * | 8/2005 | Bodas | 713/320 |
| 7,050,959 B1 * | 5/2006 | Pollard et al. | 703/21 |

(Continued)

FOREIGN PATENT DOCUMENTS

EP    0699992 A1    3/1996

(Continued)

OTHER PUBLICATIONS

Brooks, David; Martonosi, Margaret; Dynamic Thermal Management for High-Performance Microprocessors; 2001 IEEE; p. 171-182.*

(Continued)

*Primary Examiner*—Chun Cao
(74) *Attorney, Agent, or Firm*—Schwegman, Lundberg & Woessner, P.A.

(57) ABSTRACT

The operating rate of an electronic system is maximized without exceeding a thermal constraint, such as a maximum junction temperature of an integrated circuit (IC) or other portion of the electronic system. An operating parameter of the system that controls the thermal output of the system is calculated for an upcoming time period based upon the previously measured thermal performance relationship to the operating parameter level. If the predicted thermal performance will exceed a maximum allowable level of the thermal constraint, then the operating parameter is reduced by an amount calculated to keep the thermal constraint at a level just below the maximum allowable level, thus resulting in an optimal control approach to maximizing the system performance while not exceeding the thermal constraint.

22 Claims, 3 Drawing Sheets

U.S. PATENT DOCUMENTS

| | | | |
|---|---|---|---|
| 7,085,945 B2 | 8/2006 | Silvester | |
| 7,141,953 B2 | 11/2006 | Cohen et al. | |
| 7,155,623 B2 * | 12/2006 | Lefurgy et al. | 713/324 |
| 2002/0087896 A1 | 7/2002 | Cline et al. | |
| 2002/0099514 A1 * | 7/2002 | Watts, Jr. | 702/132 |
| 2003/0217297 A1 * | 11/2003 | Gschwind et al. | 713/300 |
| 2004/0117680 A1 * | 6/2004 | Naffziger | 713/322 |
| 2004/0148528 A1 | 7/2004 | Silvester | |
| 2004/0215988 A1 | 10/2004 | Clabes et al. | |
| 2005/0088137 A1 | 4/2005 | Cohen et al. | |
| 2005/0125701 A1 * | 6/2005 | Hensbergen et al. | 713/320 |
| 2005/0218480 A1 | 10/2005 | Usui et al. | |
| 2006/0020831 A1 | 1/2006 | Golla et al. | |
| 2006/0136076 A1 | 6/2006 | Rotem et al. | |
| 2006/0273753 A1 | 12/2006 | Cohen et al. | |
| 2006/0288241 A1 * | 12/2006 | Felter et al. | 713/300 |
| 2008/0059111 A1 * | 3/2008 | Sri-Jayantha et al. | 702/132 |

FOREIGN PATENT DOCUMENTS

| | | |
|---|---|---|
| EP | 0712064 A1 | 5/1996 |
| WO | WO-98/13935 A1 | 4/1998 |
| WO | WO-03/050663 A2 | 6/2003 |

OTHER PUBLICATIONS

"Enhanced Intel® SpeedStep® Technology for the Intel® Pentium® M Processor", *Intel® White Paper, Order No. 301170-001*, (Mar. 2004), 12 pgs.

"Mobile Intel® Pentium® III Processors—Intel® SpeedStep® Technology", [online]. [archived Apr. 24, 2005]. Retrieved from the Internet: <URL: http://web.archive.org/web/20050424124900/http://www.intel.com/support/processors/mobile/pentiumiii/sb/CS-007509.htm>, 2 pgs.

Huang, M., et al. "The Design of DEETM: A Framework for Dynamic Energy Efficiency and Temperature Management", *Journal of Instruction-Level Parallelism*, vol. 3, (2002), 1-31.

Skadron, K., et al., "Control-Theoretic Techniques and Thermal-RC Modeling for Accurate and Localized Dynamic Thermal Management", *Proceedings, 8th International Symposium on High-Performance Computer Architecture (HPCA '02)*, (Feb. 2002), 1-12.

Skadron, K., et al., "Temperature-Aware Microarchitecture", *Proceedings, 30th International Symposium on Computer Architecture (ISCA '03)*, (Jun. 2003), 1-12.

Srinivasan, J., et al., "Predictive Dynamic Thermal Management for Multimedia Applications", *Proceedings, 17th Annual International Conference on Supercomputing (ICS '03)*, (Jun. 2003),109-120.

* cited by examiner

COMBINING POWER PREDICTION AND OPTIMAL CONTROL APPROACHES FOR PERFORMANCE OPTIMIZATION IN THERMALLY LIMITED DESIGNS

TECHNICAL FIELD

This application relates generally to devices that produce heat as a byproduct of their operation and have a thermal limitation on how much heat they can tolerate, and more particularly, to electronic devices such as integrated circuits (ICs) and electronic devices such as computers.

BACKGROUND INFORMATION

The electronic and semiconductor device industry has a market driven need to increase operational speed and clock rates. As the operational speeds have increased in recent device designs, the maximum operating frequency has become more limited by thermal constraints than by the processing technology's ability to manufacture improved and smaller devices, or the design capability to place and route more transistors and conductors on a given area of semiconductor substrate. For example, it is known that placing too many transistors in a given area may result in what is known as the junction temperature of the device exceeding reliability levels. This is significant because the rate at which the various failure mechanisms in mechanical, electronic and semiconductor devices occur typically obey an exponential law, which may be called the Arrhenius reaction law, and thus an increase in junction temperature of only 10 degrees may result in a doubling of a particular failure rate mechanism.

It is known to prevent a system from overheating by reducing the operating speed if the measured temperature of the system reaches a selected trigger value. Such a method may be known as adaptive throttling. Adaptive throttling methods do not rely upon a knowledge of the past power consumption of the system or use a thermal model of the system. They are reactive methods that respond to the thermal limit being reached, and provide a mechanism for handling variations from the normal operating situation, such as the case of an unexpected high power consumption occurrence. These methods react dynamically to the value of the thermal limitation and reduce the normal operating frequency (for example, a clock rate) to a default lower rate if, for example, the semiconductor junction temperature exceeds a preselected maximum value. Adaptive throttling methods are part of a more general class of control systems that may be known as dynamic thermal management (DTM) methods, which may be reactive like the adaptive throttling, or predictive, and which may use various thermal models to help the predictions. DTM systems may reduce the operating voltage supply value to slow an on-die clock generator to a lower level and thus reduce the thermal output and junction temperature, or DTM systems may adjust both the operating voltage and the clock rate.

An example of a DTM thermal management system might work by dropping the operating frequency or clock rate to half the normal value until the monitored junction temperature drops below the maximum allowable level, and then resetting the operating frequency to the normal value. Another example might be adjusting the operating voltage to a lower value, or adjusting both frequency and operating voltage in response to approaching or passing a thermal constraint value. This is what may be known as a reactive system, and may result in an electronic system repeatedly approaching and surpassing the maximum junction temperature, or some other thermal limit, and then suffer a large drop in system performance until the junction temperature drops below the limit. Other types of control systems may calculate the future effects of current trends in temperature and gradually lower the operating rate to slow or prevent the system from reaching the thermal limitation. Such a system is described in co-pending application Ser. No. 10/934,295 filed Sep. 3, 2004.

Thus there exists a need in the art for an online optimizing controller that may use any type of thermal model to calculate a solution to the full power limit situation, and adjust the calculated solution to account for situations where the input power is not dependent upon assumptions of the upcoming power usage or duty cycle levels. The controller must be able to control the operating rate of the overall system by controlling the thermal limits on some, or all of the subsystems of the electronic system, where each of the controlled subsystems has its own thermal constraints and an operating factor or an operating rate that can affect the thermal performance of the subsystem. The system must account for controlling each element or subsystem to maximize performance without exceeding the elements thermal limit, and the even distribution of power density throughout the entire system.

DETAILED DESCRIPTION

Figure 1:
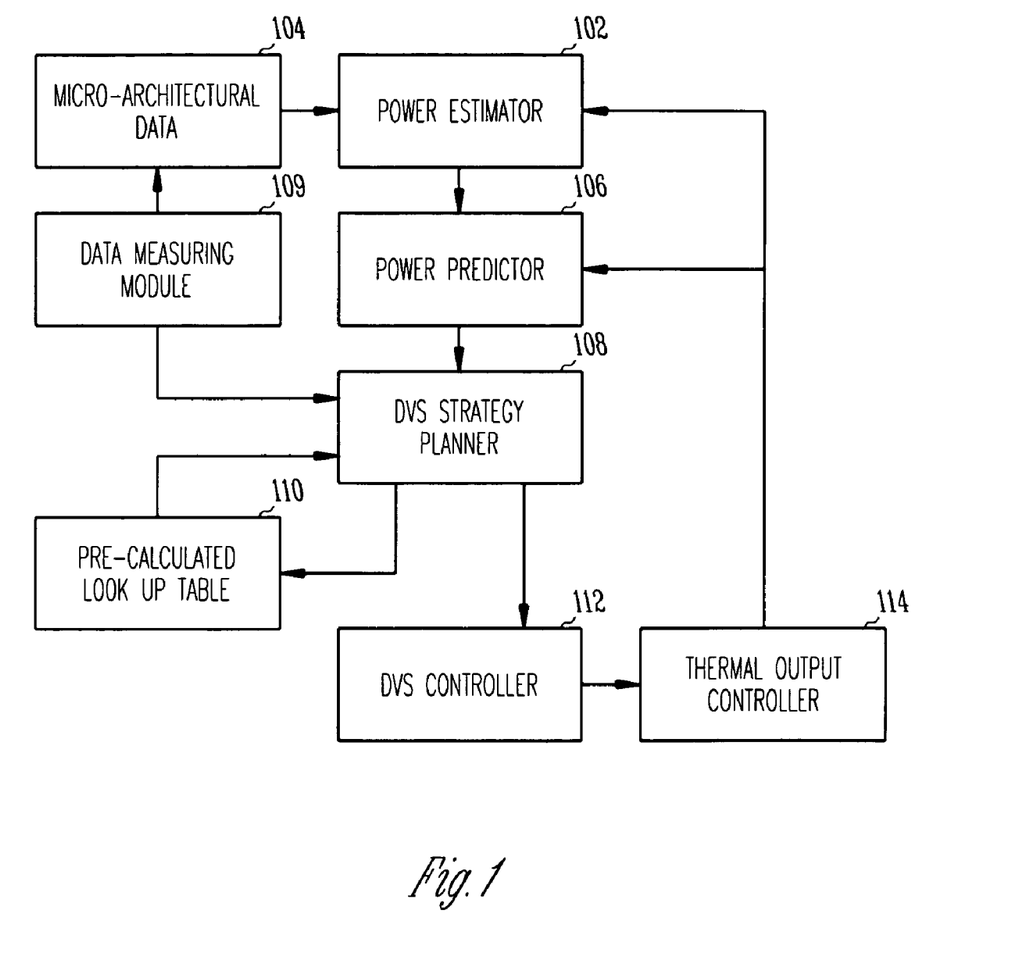
FIG. 1, illustrates an embodiment of a control system according to an illustrative embodiment of the invention.

Referring now to FIG. 1, a system 100 having a thermal limit that depends upon a controllable performance factor or performance rate of the system is shown as a block diagram. The present subject matter makes it possible to optimize (i.e., improve at least one measure of performance over the current state) the performance of a system 100 without exceeding a thermal limitation of the system by means of proper adjustment of selected system performance factors, such as operating voltage and operating frequency, by using numerical optimization techniques to determine an off-line schedule for power usage in elements of the system using a power predictor 106 (which may be either on-line or off-line), then building an on-line schedule by predicting the systems future behavior and using it in turn as an input to the offline scheduler.

The term "optimal" as used in this application is defined as resulting in an improvement in system output due to adjusting at least one operating parameter, operating factor or operating rate of the heat generating device, such as the operating frequency of an electronic system, without violating any of the defined operating limitations, such as the thermal maximum or the maximum possible operating clock frequency. The term "on-line" as used in this application is defined as operating in real time with the system and providing substantially immediate responses to changes in the state of the system. The term "off-line" as used in the application is defined as not being an "on-line" operation, but may however be included inside the system or IC.

The term "DTM" as used in this application is defined as dynamic thermal management, which adjusts at least one operating performance factor or rate of the system to prevent the system from exceeding a thermal limitation during an upcoming time increment period. The term "DVS" as used in this application is defined as dynamic voltage scaling, and is a DTM method which may be used in ICs or other systems where the operating voltage controls at least a portion of the thermal output of the system.

In this embodiment of an illustrative system, the power estimator module 102 obtains information on micro-architectural events that have occurred to the system 100 in a previous time interval from at least one meter or measuring device in micro-architectural data module 104. The time intervals may be selected to have a length that is sufficiently short such that a current power consumption measurement is unlikely to exceed an allowable range during the time interval, or is unlikely to change enough during the time period to go outside a calculated range. Thus, power consumption inside the time interval will remain stable enough that numerical approximations of the actual power profile curve may be used with sufficient accuracy. Thus the length of the selected time interval may vary depending upon the accuracy desired for the prediction of future power usage. The micro-architectural data module 104 may collect information and history on power evolution curves, IC junction temperature levels and trends, device operating frequency, voltage levels, and other micro-architectural information. It should be noted that the system 100 may be any type of power consuming system, such as a heat engine or electronic device, and that the various modules discussed herein may be part of the system, as shown in FIG. 1 as being internal to the system itself, or any or all of the modules may be external to the system 100. The power estimator 102 produces a measurement or an estimation for what may be known as the power map evolution of the system for a previous time interval. It should be noted that the power of the system need not have been a constant during the time period, and may have risen or fallen (as a first order equation), or risen and fallen (as in a quadratic or higher order equation) during the time period. The form or shape of the power change is only significant if the power map evolution curve can not be calculated or numerically estimated for the next time period.

The power map evolution calculated in the power estimator 102 from the measured or estimated micro-architectural events is provided to the power predictor module 106. The power predictor module predicts the power map evolution for at least one upcoming time increment period, using the previous history of the system in situations similar to the current system usage, and using the information provided by the power estimator for the previous time increment. The power predictor 106 may predict the power map evolution for a system as a whole, or for individual subsystems, provided that each of the subsystems has an operating parameter, such as supplied voltage, that controls a performance factor or performance rate affecting the thermal output of the subsystem. In the case of the power predictor 106 operating on a group of subsystems of the system 100, for example the cache memory, the ALU, and the instruction registers of a microprocessor, each of the separate subsystems having its own controllable operating frequency, the power predictor calculates normalized power maps for each block or subsystem, and sends the power predictions to the DVS strategy planner 108.

The DVS strategy planner 108 may be an off-line calculation system for determining the optimal DVS strategy for the system using the normalized power maps for each subsystem, or block of subsystems, sent by the power predictor 106. The DVS strategy planner 108 may also have a direct input, such as current junction temperature, from the data measuring module 109, if such information is too time sensitive to allow the small delay in the power estimator module 102 and the power predictor module 106 to outdate the measurement. In an embodiment, the difficult calculations of the optimal future power map for each of the subsystems, or block of subsystems, making up the system 100 may be completed more rapidly by the use of pre-calculated lookup tables, as shown in this illustrative embodiment of the invention as block 110, having two way communication with the DVS strategy planner module 108. In an embodiment, the optimal strategy is calculated off-line and then used on-line with the power predictor to calculate the values to be used in a next time period to achieve the calculated optimal strategy.

The results of the DVS strategy planner 108, either with or without the help of the lookup tables 110, is sent to the DVS controller 112, which sets either the operating voltage of the system or subsystem, or the clock rate, or operating frequency, or whatever performance factor controls the performance of the particular system, and thus controls the thermal output of the system at block 114. The term "voltage" as used herein, refers to a comparative value in a power supply level, and the use of the term "ground" herein refers to the reference voltage level. The use of the term "frequency" herein refers to a rate of a repeating action, such as the number of times per second that an IC cycles through a series of steps, or the clock rate of an IC, or a number of revolutions made by a mechanical object such as a rotating drive shaft.

The operating voltage, frequency, current temperature or other performance factor imposed on the system by the on-line control module 114 is added to the history input of the power predictor 106, as was discussed above. The same information may also be provided to the power estimator 102, for example to act as a sanity check for comparison to current measurements and estimations.

Thus the system 100 control system is a method for optimizing the operation of a system having a thermal limitation, by determining operating parameters for a plurality of components of a system that have at least one thermal constraint depending upon a performance factor of the component, such as the operating frequency of an IC affects the heat generated by the operation of the IC. The method predicts a performance factor for each of components for an upcoming time period t; and determines a maximum performance rate for each component of the system that does not result in exceeding the thermal constraint or the maximum possible operating rate of the component. In an embodiment, the method includes predicting a performance factor for each one of the components that includes predicting a power profile for the component for the upcoming time period t, and for at least one additional time period t+1. In an embodiment, the optimal DVS strategy is calculated off-line, and used with the power predictor on-line.

The power profiles for each component are combined to form an overall system power profile. Then an optimum performance factor for the system is determined that results in not exceeding a thermal constraint while obtaining a maximum operating rate of the system. If a measured power profile is not available, then the power may be predicted using the power predictor 106 and prior history of the component. The performance factor that is calculated does not have to be a constant rate over the entire time period, but may be a linearly increasing operating frequency over the time period, or may be an asymptotic curve approaching a maximum operating rate, or other function of time, such as a time dependent variable frequency of operation, or an operating voltage of the electronic device. The thermal constraint of the system may typically be a maximum junction temperature for an IC. It should be noted that the method does not need to determine operating parameters for every single one of the components of the system, and may be applied to only the most significant heat producers, or to the components known by experience to most affect the overall operation of the system.

The data input to the system 100 typically includes an apparatus having a meter 109 to measure a temperature (such as a semiconductor junction temperature) or a value of a thermal constraint in a power consuming system 100, and a calculator 102 to determine a future time interval $t_i$ during which power consumption value P must remain within a predetermined range and a power profile. A planner 108 (which may be off-line) then optimizes the system 100 performance while operating within the thermal limitation. A controller 112 operates the system inputs at 114 (e.g., the operating voltage or clock frequency) at an operating frequency $f$ and at an operating voltage V which operates the system at a calculated rate (that does not exceed a system maximum operating rate $f_{MAX}$) until the controller receives the next iteration from the calculator, which may determine that the optimal operation of the system requires a change in the settings for the value of operating voltage and frequency. Such a change may result from the calculation determining that the thermal constraint will be exceeded during one of the calculated upcoming time intervals, which is the same situation as in the adaptive throttling method previously described, which then reduces the values $f$ and V to bring the power consumption to a level that will not exceed the thermal constraint during the calculated time intervals $t_i$. Alternatively, the change may result from the off-line DVS strategy planner determining that a smoother overall system temperature profile would result from adjusting the operating parameters of certain subsystems. Other reasons for changes in some or all of the subsystems operations may easily be imagined.

The DVS planner 108 operates by first breaking the overall system 100 into a number n of subsystems or blocks. It is thus possible that the number n is equal to 1, and the system may be treated as a single element. The control system 100 monitors the state of the system having the thermal limit 100, and invokes the DVS mechanism 108 and 112 if necessary on a periodic basis for each small time increment Δt. Thus the current time period is t, and the first time period of the calculation is $t_0$, and any other time period is $t_i=t_0+i\,\Delta t$. If there are p time intervals in the calculation then the last time period is thus $t_{max}=t_0+p\,\Delta t$.

The overall control system may have more than a single DVS controller 112, as may be the case in a computer system having numerous modules, or even in a multi-core microprocessor. The number of DVS controllers 112 is given as s, and each controller 112 controls a (not necessarily disjoint) set of blocks. Each block controlled by the DVS controller will have a normalized power of the workload, which is denoted $\pi_{ik}$, where k is the $k^{th}$ DVS controller 112 of the total s controllers, and i is the $i^{th}$ time period of the total of p time increments. Thus $\pi_{ik}$ is the total normalized power of the $k^{th}$ DVS controller in time interval $[t_i, t_{i+}]$ at whatever the particular operating voltage or frequency happens to have been set for that time increment. In an embodiment, the time increment is set fine enough so that the normalized workload power can be considered essentially constant (i.e., a zero slope) within each interval. In other embodiments the workload power may be approximated by a linear line having a slope, or a quadratic curve, or many other known approximation techniques. This may be called the power profile of the time increment.

Figure 2:
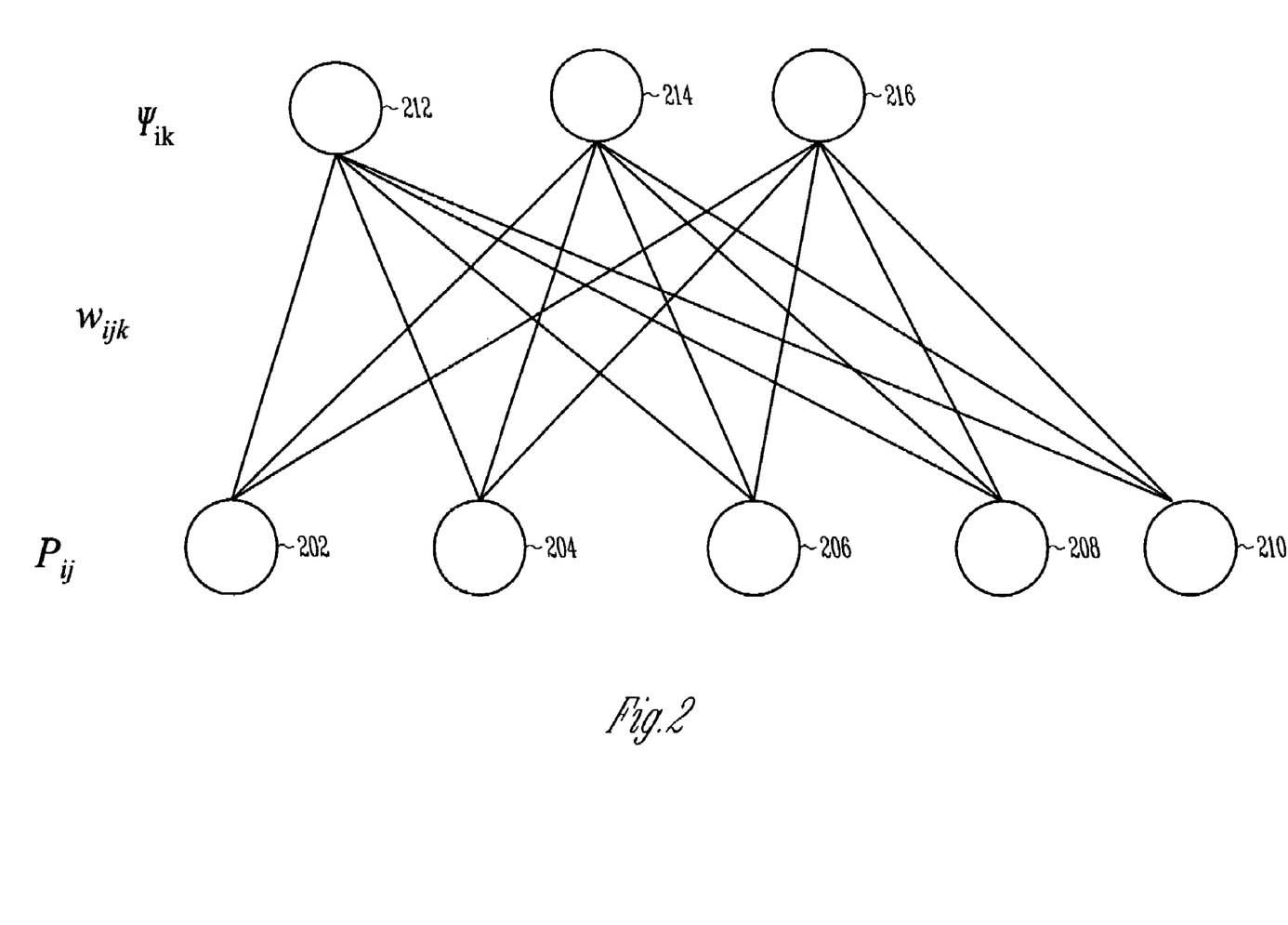
FIG. 2 illustrates calculation flow for embodiments of general control methods.

Referring now to FIG. 2, the possible flow of calculation and control instructions for a system 200, made up of five representative blocks 202-210 of, for illustrative example circuitry, and having three representative DVS controllers 212-216, as discussed previously with regard to FIG. 1. The general case is shown in which each controller interacts with each of the blocks, but the present subject matter is not so limited. The $k^{th}$ DVS controller during the $i^{th}$ time period has a total power of $\psi_{ik}$ which is related to $\pi_{ik}$ as the actual power to the normalized power discussed previously, and is used since the DVS controllers 212-216 change the calculated normalized power into a real power application. Since each DVS controller in the general case shown has an interaction with each block, the total power P of a $j^{th}$ block will be $P_{ij}=\Sigma W_{ijk}\psi_{ik}$ summed over all k of the DVS controllers interacting with the $j^{th}$ block during the $i^{th}$ time period. The $W_{ijk}$ factor is the weighting factor for each of the interactions of the $j^{th}$ block with each of $k^{th}$ DVS controllers that are connected to that block. In the illustrative embodiment shown all of the three shown DVS controllers have an interaction with every $j^{th}$ block, but the present subject matter is not so limited, and many simpler embodiments may easily be imagined that are contained within the illustrative embodiment.

If the temperature of the $j^{th}$ block in the $i^{th}$ time period is $T_{ij}$, then the temperature and power of a block during a particular time period may be calculated using a matrix $W_i$ of n×s coefficients of power distribution weighting factors to obtain the power $P_i=W_i\psi_i$ of the $i^{th}$ time period. In an embodiment, the thermal behavior of the system during a short enough time period may be approximated by the linear thermal model, and satisfies a differential equation of the typical form of T(t)=AT(t)+BP(t), relating the temperature to the power. This approximation has been validated in commercially important situations. The thermal constraint of the system 200 may be written as $T(t)\leq T_{MAX}$ for any system having a maximum allowable temperature, or for any subsystem or block of the system that is to be controlled, such 202-210.

Finally, assuming that the optimization criterion may be written in terms of the power controlled by the DVS systems 212-216, as a function $f$ of the power $\psi_{ik}$, the calculation takes the form $f(\psi_{11}, \ldots, \psi_{ps})$, where p is the total number of time periods as before, and s is the total number of controllers as before. Using the number of cycles per second (i.e., frequency) to be the parameter to optimize, and assuming the relationship between frequency and power is a third power of the frequency, then $f(\psi_{11}, \ldots, \psi_{ps})=\Sigma\Sigma(\psi_{ik}/\pi_{ik})^{1/3}$ for $1\leq i\leq p$ and $1\leq k\leq s$.

By adding up all of the possible power interactions as shown above using the off-line algorithm described in detail below, the system calculates numerically an optimal off-line schedule or partition of power to each of the separately blocks of system 200, using the measured values of the just ended time period, or some other recent time period, as shown in FIG. 1, element 104, and using past history of the particular device, as shown in FIG. 1, element 108. The accuracy of the power predictor 106 of FIG. 1, will affect the overall accuracy of the system, but the iterative nature of the system causes rapid convergence to an optimum level. Examples of the type of power prediction systems adequate for the present invention include simple moving averages of past measured power consumption or other window based filter. In the case where the time taken for making the above described calculations of the interaction matrix is too long for the stability of the system and the selected time increment length, the calculation may be replaced, as shown in FIG. 1 element 110, by a pre-calculated look up table. Additional effects such as leakage, capacitance and inductive power loss from system voltage and frequency changes, and additional heat generators may be empirically included in the value of the constants. The described method uses general optimal strategies to provide an off-line calculation that may be adjusted using the on-line algorithm described in detail below to obtain a control system that is not simply reactive like an adaptive throttling system, and predicts power for each system element to optimize the overall system performance.

An algorithm for on-line control that may be used in the various described embodiments calculates the normalized power maps per block $P_i, P_{i+1}, P_{i+2}, P_{i+3}, \ldots P_{i+w-1}$, and reconstructs the value of the distribution coefficients $W_i, W_{i+1}, W_{i+2}, W_{i+3}, \ldots W_{i+w-1}$, and the normalized power $\pi_i, \pi_{i+1}, \pi_{i+2}, \pi_{i+3}, \ldots \pi_{i+w-1}$ where w is the number of future time intervals for which the prediction is made. Using the off-line optimal DVS strategy planner to either calculate or look up the optimal power assignments $\psi_i, \psi_{i+1}, \psi_{i+2}, \psi_{i+3}, \ldots \psi_{i+w-1}$, these values are used in the DVS controllers 212-216 respectively to set the value of the system control factor, for example the supply voltage, or the clock rate. At the end of the time interval the thermal limit feature, such as junction temperature, may be measured and added to the history file of the power predictor, reference 106 of FIG. 1, and the total power consumption may also be beneficially measured.

An algorithm for off-line optimal power control strategy planning that may be used in the various described embodiments calculates the optimal values using a mathematical programming model, using an objective function $f(\psi_{11}, \ldots, \psi_{ps})$, under the constraint that the temperature does not exceed the maximum, or $T(t) \leq T_{max}$ as discussed three paragraphs above. The model may be linear if appropriate sized time periods are used. The constraints needed to linearized the optimal off-line strategy model discussed above may include refining the time granularity as discussed previously. For any time interval one constraint must be $T(t) \leq T_{max}$, and the variations in the overall device duty cycles may mean that the length of the upcoming time period may not be the same as previous periods in order to maintain a preferred range of temperature changes. This time granularity may be expressed as $\Delta t/q$ where q is the number of sub intervals into which the next time intervals $t_1, t_2, t_3, t_4, \ldots t_{pq}$ are to be divided in order to maintain the constraint that $T(t) \leq T_{max}$.

This may be done in a matrix form in one embodiment, where the linear thermal model discussed previously $T(t)=AT(t)+BP(t)$, has A and B as matrices having size n×n. The power assignment matrix is $\psi_i=[\psi_1 \ldots \psi_i]$ having a size s×1, where s is the total number of controllers as before. A matrix $\Gamma=e^{A \Delta t/q}$ has a size of n×n, and another matrix $\Phi=[\Gamma-I]A^{-1}B$ also has a size of n×n, where I is the identity matrix. The recursive sequence $\Lambda_i$ of size n×s matrices, where $\Lambda_1=\Phi W_1$, and $\Lambda_i=[\Gamma\Delta_{i-1}\Phi W_i]$. Under this illustrative method the thermal constraints may be written in linear form as $\Lambda_i \psi_i \leq T_{max} - \Gamma^i T_0$. Other linear and non linear algorithms and approximations may be used in the described optimal off-line power strategy planner, to be used in conjunction with the on-line control algorithm, measuring systems and control systems, as described above.

Figure 3:
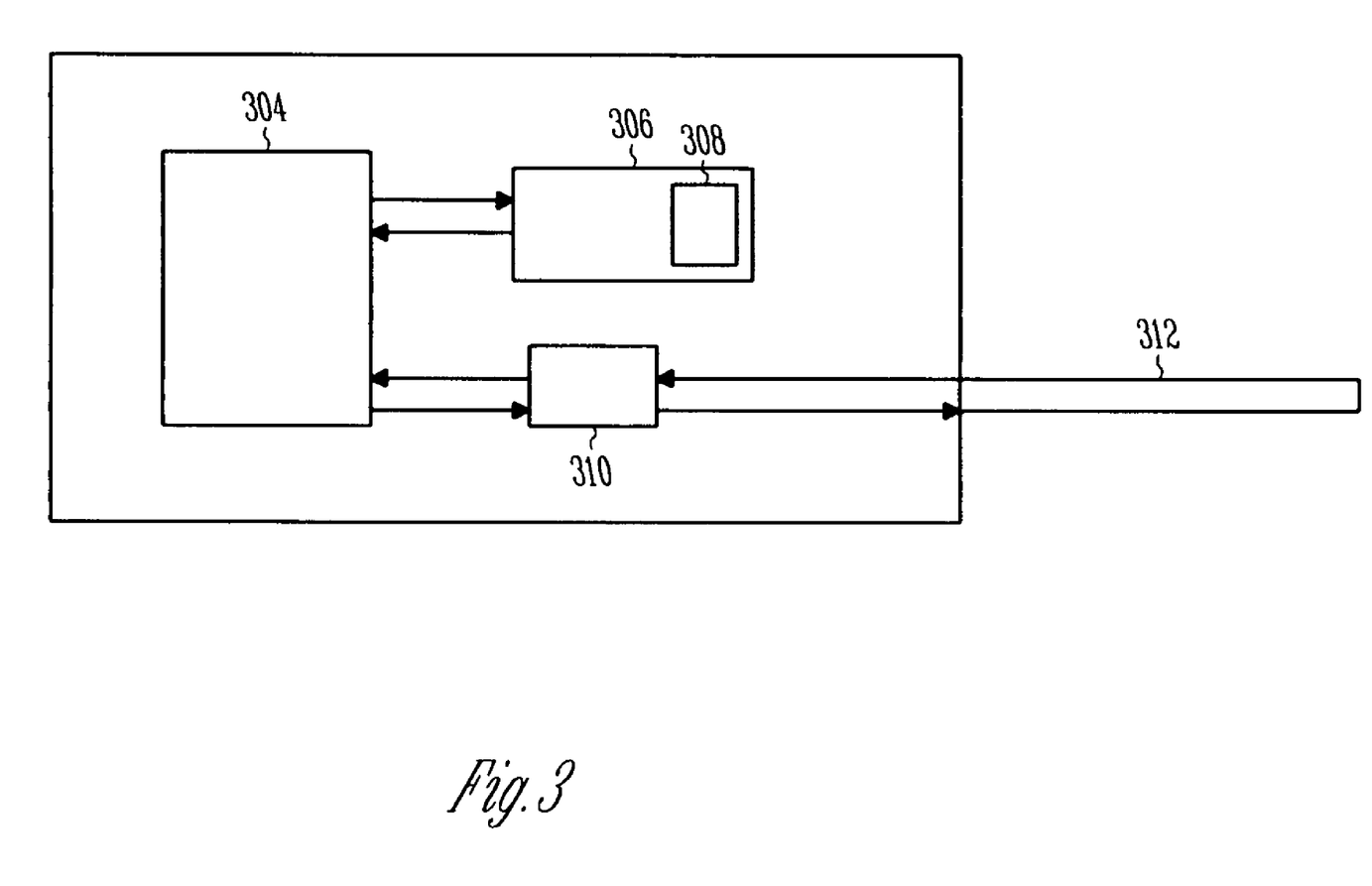
FIG. 3 illustrates a block diagram of an article of manufacture according to various embodiments of the invention.

FIG. 3 is a block diagram of an article of manufacture 302 according to various embodiments of the invention, such as a communications network, a computer, a memory system, a magnetic or optical disk, some other information storage device, and/or any type of electronic device or system. The article 302 may comprise a processor 304 coupled to a machine accessible medium such as a memory 306, storing associated information (e.g., computer program instructions 308, and/or other data), and an input/output driver 310 connected to an external electrical device by various means, such as the bus or cable 312, which when accessed, results in a machine performing such actions as calculating a solution to a mathematical problem. Various ones of the elements of the article 302, for example the processor 304, may have thermal limitation issues that may use the present invention to help alleviate and moderate the thermal situation using the present invention to control the operating rate at the optimal frequency point. As an illustrative example, the processor 304 may be arranged with an onboard temperature measuring device such as a diode junction, and with a onboard power dissipation measuring device, and thus be able to calculate the most efficient operating voltage to control the frequency of the processor 304, using methods such as that discussed and shown previously in FIGS. 1 and 2. With such an arrangement the processor 304 may respond to the varying calculation requirements of the article 302 at the maximum possible rate compatible while not exceeding the junction temperature limit.

Alternatively, the article 302 may comprise a portion or an element of a communications network in two way communications with other elements of the network by means of the bus or cable 312, or by wireless communications means included in I/O driver 310, or both cable and wireless. In this illustrative example of an element of a communications network, the two way communications by wireless may include a dipole antenna, a monopole antenna, a unidirectional antenna, a laser IR diode emitter/detector, or any other type of communication media. The processor 304 may accept signals from the I/O driver 310 and perform an operation under the control of a program in memory 306, or local provisioning information source 308.

There are numerous other devices and systems that may benefit from the use of the described embodiments. A system having a performance rate controllable by a either a single input or a combination of inputs, such as input voltage and current, and having a limitation that is a measurable quantity may use this method. The invention has been described using a simple illustrative example of a microprocessor with a varying workload and a maximum operation rate that will cause the microprocessor to eventually overheat, depending upon the system parameters and environment. The disclosed subject matter is not so limited, and may be applied to other thermally limited systems and to systems having non-thermal limits. Examples of such systems include, but are not limited to, electric motors driving a train, internal combustion engines driving variable loads, turbine engines, steam turbines driving electrical generators, and rocket engines.

The accompanying figures that form a part hereof, show by way of illustration, and not of limitation, specific embodiments in which the subject matter of the invention may be practiced. In the drawings, like numerals describe substantially similar components of the invention throughout the various views of the embodiments. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The various embodiments are not necessarily mutually exclusive, as some embodiments can be combined with one or more other embodiments to form new embodiments. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of the various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope of meaning of the claims. In addition, in the foregoing Detailed Description, it may be seen that various features are grouped together in a single embodiment for the purpose of streamlining this disclosure and increasing its clarity. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   determining operating parameters for each one of a plurality of components of a system having at least one thermal constraint, where the thermal constraint depends upon a performance factor of at least one component of the plurality of components of the system; and
   predicting a performance factor for each one of the plurality of components for an upcoming time period t combining an off-line optimizer with an on-line predictor; and
   determining a performance factor for each one of the plurality of components of the system that results in not exceeding the at least one thermal constraint and a maximum allowable operating rate of the component.

2. The method of claim 1, wherein predicting a performance factor for each one of the plurality of components includes predicting a power profile for the component for the upcoming time period t, and for at least one additional time period t+1.

3. The method of claim 1, wherein prior to predicting a performance factor during a time t, the performance factor of the component during a previous time period t−1, is determined.

4. The method of claim 1, wherein the plurality of components is divided into groups of components having similar power profiles in at least one previous time period t−1, and the predicting a performance factor is performed on the group.

5. The method of claim 2, wherein the power profiles for each component are combined to form a system power profile and determining an optimum performance factor for the system that results in not exceeding a thermal constraint and a maximum allowable operating rate of the system, and results in a more uniform system power distribution.

6. The method of claim 5, wherein the power profiles are predicted using a power predictor if a measured power input is unavailable.

7. The method of claim 1, wherein the performance factor determined for each one of the plurality of components for an upcoming time period t is not a constant rate over the entire time period.

8. The method of claim 7, wherein the performance factor is one of a time dependent variable frequency of operation and an operating voltage of the individual component.

9. The method of claim 1, wherein the thermal constraint of the system comprises a maximum junction temperature.

10. The method of claim 1, wherein the step of determining operating parameters for each one of the plurality of components of a system is not performed on every component of the system having at least one thermal constraint.

11. A method, comprising:
    determining for a first time period a value of a plurality of power influencing events in a system having a thermal constraint that is dependent upon a controllable performance factor of the system;
    determining an estimate for power consumption for the first time period;
    determining a prediction for power consumption for an upcoming second time period;
    determining a setting for the controllable performance factor for the second time period that maximizes the performance of the system;
    controlling the performance factor while monitoring a value of the thermal constraint; and
    reducing the performance factor to a predetermined value if the monitored value of the thermal constraint exceeds a predetermined value.

12. The method of claim 11, further comprising a plurality of subsystems, each individual one of the plurality of subsystems having a separate thermal constraint that is dependent upon a controllable performance factor, the prediction for power consumption for the upcoming second time period including the interaction of each individual one of the plurality of subsystems on each other individual one of the plurality to determine at least one of a total system power consumption and a system power distribution.

13. The method of claim 12, wherein determining a setting for the controllable performance factor further includes determining a setting for at least one of an operating voltage for the subsystem and an operating frequency for the subsystem.

14. The method of claim 12, wherein determining a setting for the controllable performance factor further includes determining an amount of power consumption for each individual one of the plurality of subsystems.

15. The method of claim 12, wherein the prediction for power consumption for the upcoming second time period further includes a prediction for a plurality of time periods beyond the second time period, and includes a partitioning of the power consumption for each of the plurality of time periods.

16. The method of claim 13, wherein determining the setting for at least one of an operating voltage for the subsystem and an operating frequency for the subsystem includes determining a relationship between power consumption and at least one of the operating voltage and operating frequency derived by at least one of empirical measurements, simulations and theory.

17. The method of claim 12, wherein only selected ones of the plurality of subsystems having at least one thermal constraint has the operating parameters determined.

18. An apparatus, comprising:
    at least one meter to determine a present value of a thermal constraint in a power consuming system;
    at least one calculator to determine at least one future time interval $t_i$ during which a power consumption value P must remain within a predetermined range and a power profile during the at least one time intervals $t_i$;
    at least one controller to operate the apparatus at an operating frequency f and at an operating voltage V; and
    wherein the controller operates the system at an operating rate f until the calculator determines that the thermal constraint will be exceeded during at least one of the calculated time interval $t_i$, then reduces at least one of the values f and V to reduce the power consumption to a level that does not exceed the thermal constraint during the calculated time intervals $t_i$.

19. The apparatus of claim 18, wherein the apparatus comprises a plurality of subsystems each having at least one thermal constraint;

the at least one calculator determines the time intervals, the operating frequency, and the operating voltage for at least some of the plurality of subsystems; and the at least one calculator determines $f_{MAX}$ as a function of the interactions of each one of the subsystems with each other one of the plurality of subsystems.

20. The apparatus of claim 18, wherein the apparatus comprises an electronic device.

21. The apparatus of claim 18, wherein the apparatus comprises a communications network.

22. The apparatus of claim 18, wherein the apparatus comprises a computer system.

* * * * *